United States Patent [19]

Thaller

[11] Patent Number: 5,319,785
[45] Date of Patent: Jun. 7, 1994

[54] POLLING OF I/O DEVICE STATUS COMPARISON PERFORMED IN THE POLLED I/O DEVICE

[75] Inventor: Kurt M. Thaller, Acton, Mass.

[73] Assignee: Digital Equipment Corporation, Maynard, Mass.

[21] Appl. No.: 962,624

[22] Filed: Oct. 16, 1992

Related U.S. Application Data

[63] Continuation of Ser. No. 723,142, Jun. 28, 1991.

[51] Int. Cl.⁵ .................................. G06F 11/30
[52] U.S. Cl. .................. 395/725; 364/DIG. 1; 364/241.1; 364/259; 364/259.2; 364/259.7; 364/264; 364/264.1; 364/264.6; 364/271.5; 364/940; 364/940.1
[58] Field of Search ............. 340/500, 505, 506, 825.06, 340/825.07, 825.08; 364/200 MS, 900 MS; 395/200, 325, 275, 725; 371/16.3, 62

[56] References Cited

U.S. PATENT DOCUMENTS

| 3,851,310 | 11/1974 | Taylor | 340/825.08 |
|---|---|---|---|
| 4,149,144 | 4/1979 | Diefenderfer | 370/85.8 |
| 4,167,730 | 9/1979 | Brown | 340/825.08 |
| 4,177,512 | 12/1979 | Moggia | 395/200 |
| 4,261,034 | 4/1981 | Saccomano et al. | 395/275 |
| 4,271,465 | 6/1981 | Ohtsuna et al. | 395/325 |
| 4,545,011 | 10/1985 | Lyon et al. | 395/200 |
| 4,554,461 | 11/1985 | Oho et al. | 307/40 |
| 4,595,921 | 6/1986 | Wang et al. | 340/825.08 |
| 4,598,363 | 7/1986 | Clark et al. | 395/250 |
| 4,604,618 | 8/1986 | Akiba et al. | 340/825.06 |
| 4,638,428 | 1/1987 | Gemma et al. | 395/725 |
| 4,639,889 | 1/1987 | Matsumoto et al. | 395/275 |
| 4,689,619 | 8/1987 | O'Brien, Jr. | 340/825.08 |
| 4,698,746 | 10/1987 | Goldstein | 395/200 |
| 4,766,596 | 8/1988 | Michels-Krohn et al. | 371/62 |
| 4,768,149 | 8/1988 | Konopik et al. | 395/275 |
| 4,779,195 | 10/1988 | James | 395/275 |
| 4,851,987 | 7/1989 | Day | 348/224 |
| 4,875,158 | 10/1989 | Ashkin et al. | 395/275 |
| 4,888,684 | 12/1989 | Lilja et al. | 395/325 |
| 4,937,733 | 6/1990 | Gillet, Jr. et al. | 364/200 |
| 4,940,974 | 7/1990 | Sojka | 340/825.08 |
| 4,962,373 | 10/1990 | Sirois | 340/693 |
| 4,996,518 | 2/1991 | Takahashi | 340/518 |
| 5,053,883 | 10/1991 | Johnson | 358/349 |
| 5,097,470 | 3/1992 | Gihl | 371/52 |
| 5,150,114 | 9/1992 | Johansson | 340/825.54 |

Primary Examiner—Dale M. Shaw
Assistant Examiner—Lance Leonard Barry
Attorney, Agent, or Firm—Albert P. Cefalo; Dirk Brinkman; James F. Thompson

[57] ABSTRACT

A method and apparatus for polling a status register selectively delays the returning of status data in the status register. Prior to polling, a match register is loaded via a system bus with a desired status. Status data is presented to the system bus when the status data is the same as the desired status. The features of the invention also permit the masking of selective bits of the status register during the comparison of the status data with the desired status. A mode register selectively inhibits the delayed presentation, and a timer ensures that status data is presented to the system bus within a predetermined interval even if the status data is not the same as the desired status.

8 Claims, 5 Drawing Sheets

POLLING OF I/O DEVICE STATUS COMPARISON PERFORMED IN THE POLLED I/O DEVICE

This application is a continuation of application Ser. No. 07/723,142, filed Jun. 28, 1991.

FIELD OF THE INVENTION

This invention relates to improvements in polling systems for computers and more particularly relates to improvements in a polling system used in conjunction with a status register coupled to a system bus.

BACKGROUND OF THE INVENTION

Modern digital computer systems typically include a plurality of central processor units (CPUs), memory, and a plurality of peripheral input/output (I/O) devices connected by means of a common system bus. The CPUs, memory, and I/O devices in such a computer system operate generally asynchronously, communicating data over the system bus at randomly occurring intervals.

However, from time to time, the operations in a complex computer system need to be synchronized to coordinate processing control and bus communications. The two main methods that have been used to synchronize the various CPUs and I/O devices in a computer system are interrupts and polling.

Interrupts are used generally to signal the occurrence of primarily sporadic and unanticipated events requiring immediate attention. Where the occurrence of a future desired event is anticipated, polling is generally used. Computers commonly perform polling by having a polling program repeatedly examine, via the system bus, a status register until the occurrence of the desired event is reflected by the status data in the status register. The occurrence of the event is generally indicated by the transition of the various bits in the status register to some predetermined or desired value.

However, inherently, polling has some fundamental deficiencies severely impacting system bus bandwidth and system throughput. The repeated reading of the status data in the status register during polling, over the system bus, may saturate bus throughput by consuming all of the available read/write cycles on the system bus while polling. The bus, when thus saturated, becomes essentially unavailable for communicating other transactions between the various devices connected to the bus.

These adverse consequences of polling have been minimized by decreasing the frequency of status register sampling during polling. But if the status register is examined on a less frequent basis, then it is likely that the detection of the desired event is delayed unnecessarily, severely retarding system synchronization. Therefore, it is desirable to provide a method and apparatus that afford improved polling without adversely affecting computer system operations, and it is to these ends that the present invention is directed.

SUMMARY OF THE INVENTION

The present invention improves polling of a status register in a CPU, memory, or I/O device of a computer system by selectively delaying the presentation of status data to a system bus. In accordance with the present invention, additional registers and control logic are coupled to the status register to inhibit presentation of status data to the system bus when a status register is polled by a program of the computer system. Prior to polling, a status match register and a status mask register are loaded with a bit pattern representative of a status condition desired in the status register. Subsequently, during polling when the status data in the status register are read, the control logic compares the respective bits in the status and match registers as indicated by the respective bits in the mask register. Only when the status and match registers contain identical bit patterns in the bit positions as masked, are the status data returned to the polling program. Thus, system bus load is improved by eliminating status data transfers of status conditions which are not significant.

These and other features and advantages of the present invention will become apparent from a reading of the detailed description in conjunction with the attached drawings in which like reference numerals refer to like elements in the several views.

DETAILED DESCRIPTION OF THE PREFERRED EMBODIMENT

Figure 1:
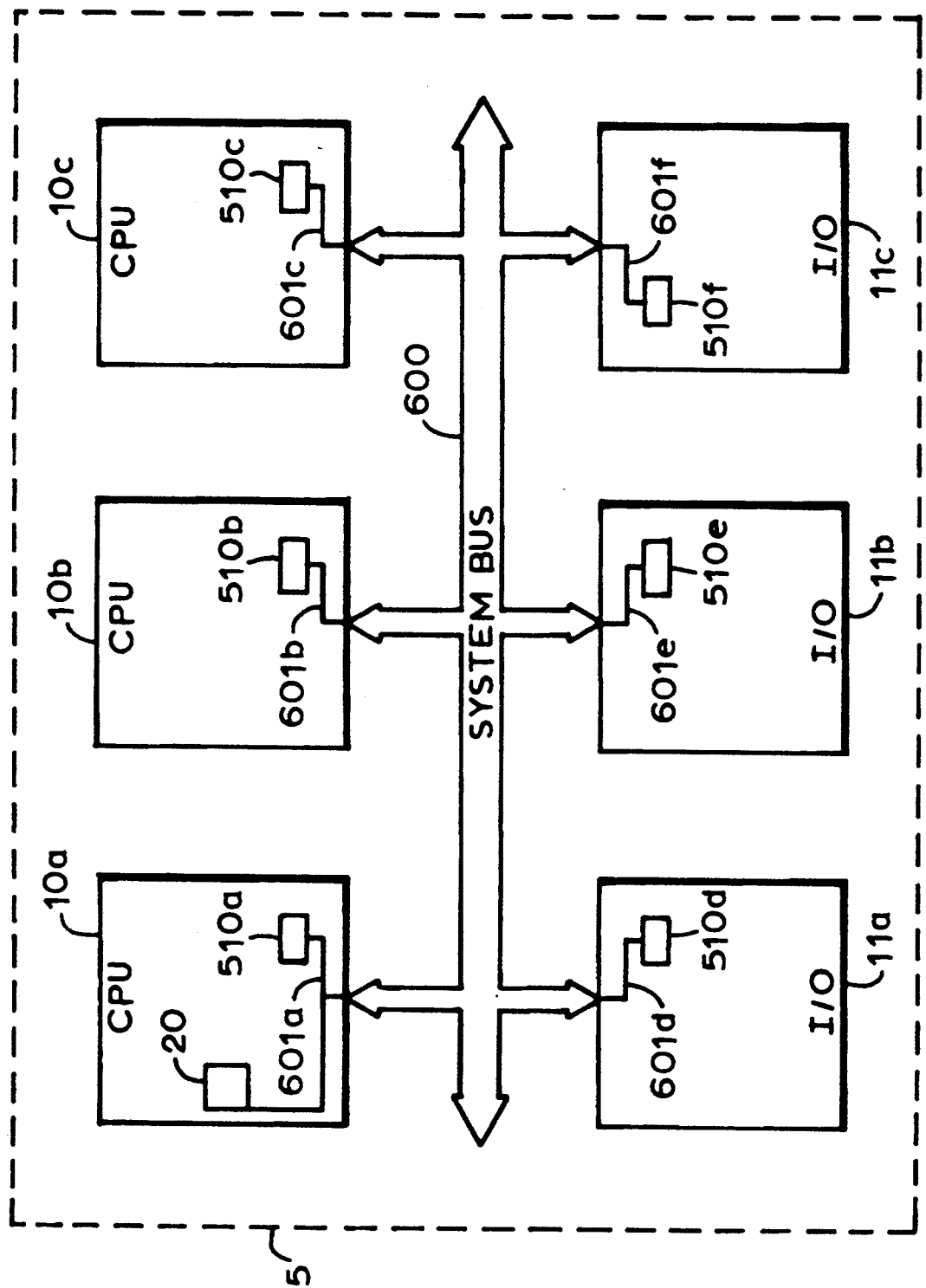
FIG. 1 is a block diagram of a multi-processor computer system.

Referring now to the drawings, and particularly to FIG. 1, there is shown a computer system 5 including a plurality of devices communicating with a system bus 600, by way of example, central processing units (CPUs) or processors 10a-10b, a memory 10c, and a plurality of Input/Output (I/O) devices 11a-11c coupled for communicating via the system bus 600. The CPUs 10a-10b, memory 10c, and I/O devices 11a-11c are sufficiently known so as not to require detailed description herein.

The system bus 600 includes generally, address, data and control lines (not shown). The address lines are used to communicate address information to the various devices. Data are communicated via the data lines, and bus command information is communicated via the command lines. The system bus 600 is, by way of example, a pended arbitrated bus allowing several transactions to be in progress at any given time. A device, such as CPU 10a, that wants to read data first requests access to, that is, arbitrates for, the system bus 600. When access to the bus 600 is granted, the requesting device (10a) presents address and command data to the bus 600. Subsequently, in response to the read request command, the data at the selected address are presented to the bus 600 to be returned to the requesting device 10a. Each of the devices coupled to a pended bus, such as system bus 600, therefore, has bus interface logic (not shown) to arbitrate and communicate according to the system bus 600 protocol.

Each of the CPUs 10a-10b, memory 10c, and each of the I/O devices 11a-11c may contain one or more status registers, some of which are labeled 510a-510f, coupled to system bus 600 by lines 601a-601f respectively. Each of the status registers 510a-510f includes means for storing one or more bits, each bit or combination of bits may be used for expressing generally a CPU, memory, or I/O device status condition, by way of example, device ready, data error, or operation complete. The methods used to set the various bits in the various status registers 510a-510f by hardware and software are sufficiently known as not to require detailed description herein. Polling of the status registers, by way of example register 510f in I/O device 11c, is generally done by a polling program 20 in one of the CPUs 10a-10b reading and interpreting the contents of the status registers 510f.

Figure 2:
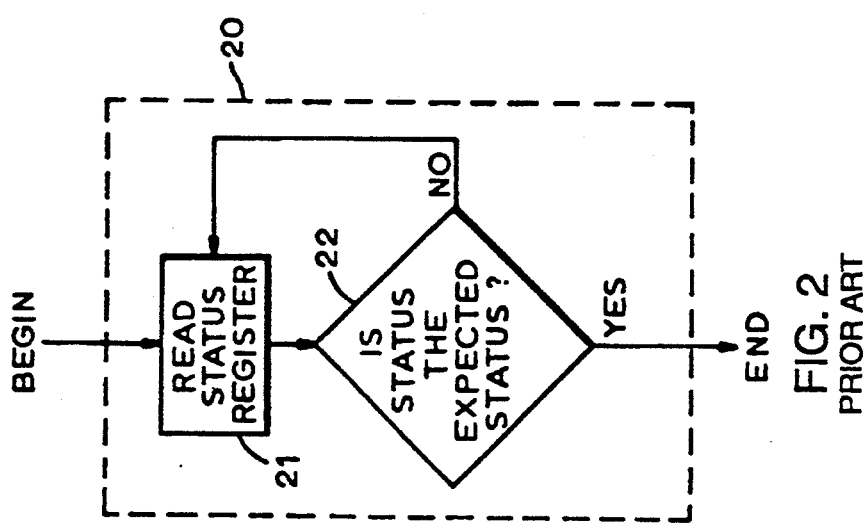
FIG. 2 is a flow diagram of a polling program of the type used in digital computer systems.

As shown in FIG. 2, which depicts a generalized flow diagram of a polling program 20, polling by software is generally s simple two step iterative operation. The first step 21 reads the status data in the status register 510f, and the second step 22 examines the status data. These two steps, 21 and 22 respectively, are repeated until the desired status condition is reflected in the bit pattern of the status data in the status register 510f.

Figure 3:
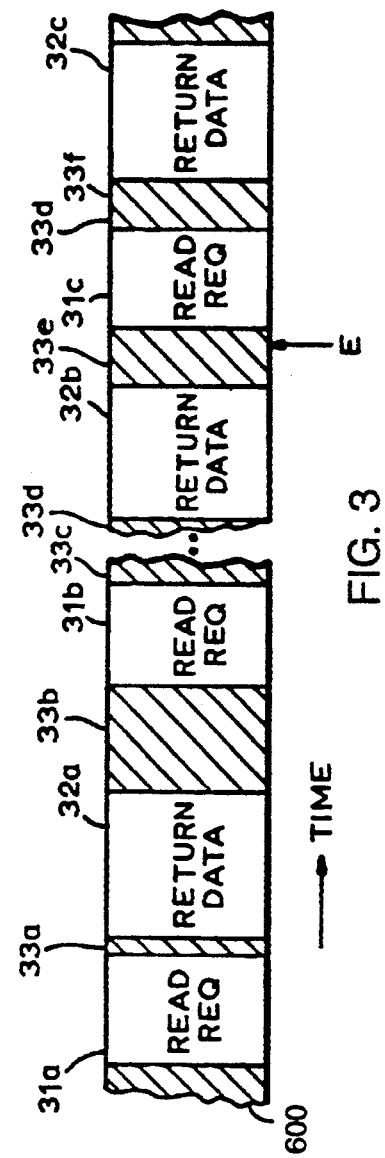
FIG. 3 is a timing diagram of system bus activity during polling.

Now referring also to FIG. 3, there is shown a generalized timing diagram that depicts bus transactions and events in sequential time intervals and demonstrates that a substantial portion of the available system bus 600 cycles are consumed as a result of the rapid repetitive reading of the status register 510f by the polling program 20. By way of example, the I/O device 11c may be non-responsive because it is off-line or otherwise inactive. When the polling program 20 executes the first step 21 to read the status register 510f, a READ REQ (request) transaction 31a is place don the bus 600. As soon as the status register 510f responds to the READ REQ transaction 31a, the contents of the status register 510f are place don the bus 600 during the RETURN DATA transaction interval 32a. If the second step 22 of the polling program 20 determines that the status data in the status register 510f are not the desired status, additional READ REQ transactions and RETURN DATA transactions, 31b and 32b respectively, are placed on the system bus 600. Only after the occurrence of the desired event, designated by the arrow lettered E, is the RETURN DATA transaction 32c, in response to the READ REQ transaction 31c, the desired status, completing the polling of the status register 510f by polling program 20.

As shown, the system bus 600 is only available for non-polling related activity during the intervening time intervals generally labeled as 33a-33f. Polling by the sofware of polling program 20, in a very short loop, may consume all of the available system bus 600 bandwidth, rendering the system bus 600 generally unavailable for other transactions and severely impacting computer system 5 total throughput.

Figure 4:
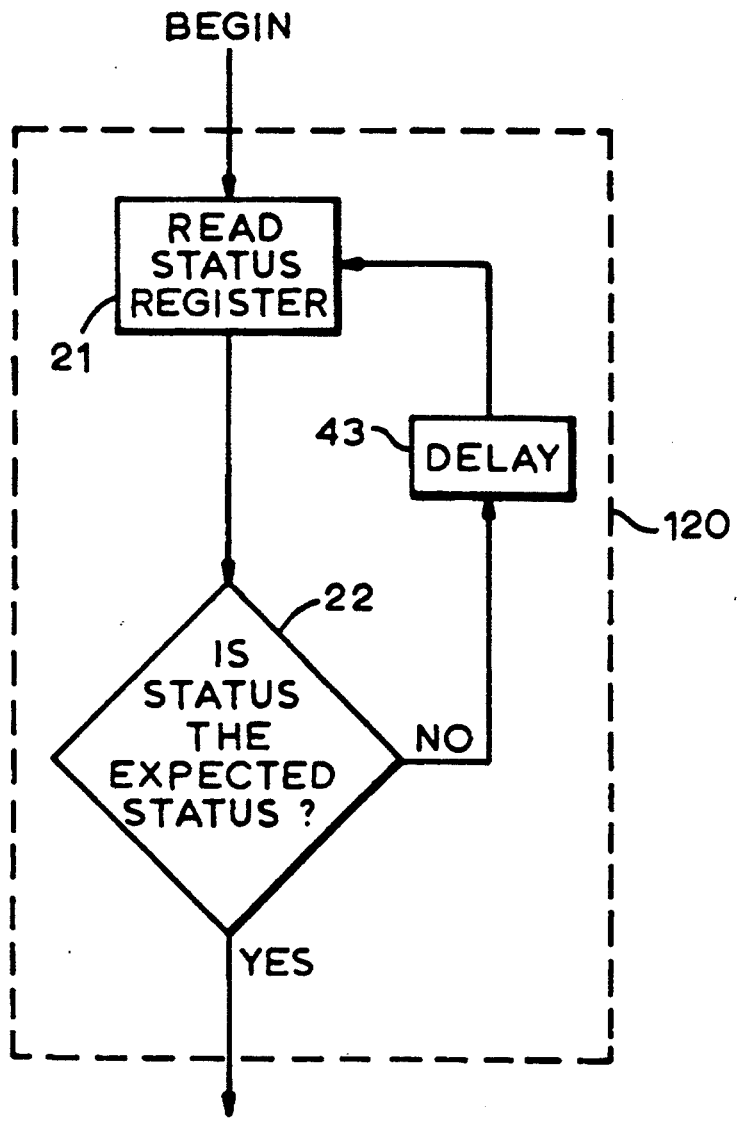
FIG. 4 is a flow diagram of a polling program similar to that of FIG. 2, but including a delay step.

The adverse impact of polling on the system bus 600 has been minimized in some system by reducing the frequency of polling by the software, as shown by the modified flow diagram 120 in FIG. 4. The introduction of a third delay step 43, which delays the re-reading of the status register 510f, increases the relative availability of bus 600 and CPU 10a for non-polling related activities by stretching the non-polling time intervals 33b, 33c, and 33d of FIG. 3. By way of example, the polling program 120 may keep a count of the number of unsuccessful samplings of the status register 510f and decrease the polling frequency accordingly. Alternatively, the polling program 120, may sample a device known to be dormant, less frequently. However, if the delay step 43 is included in the polling program 120, the eventual occurrence of the desired event E will not be detected until the delay step 43 has expired. The delay step 43, although somewhat increasing system bus 600 availability for other transactions, unnecessarily delays the timely synchronization of critical computer system 5 operations and is therefore not an optimal solution.

Figure 5:
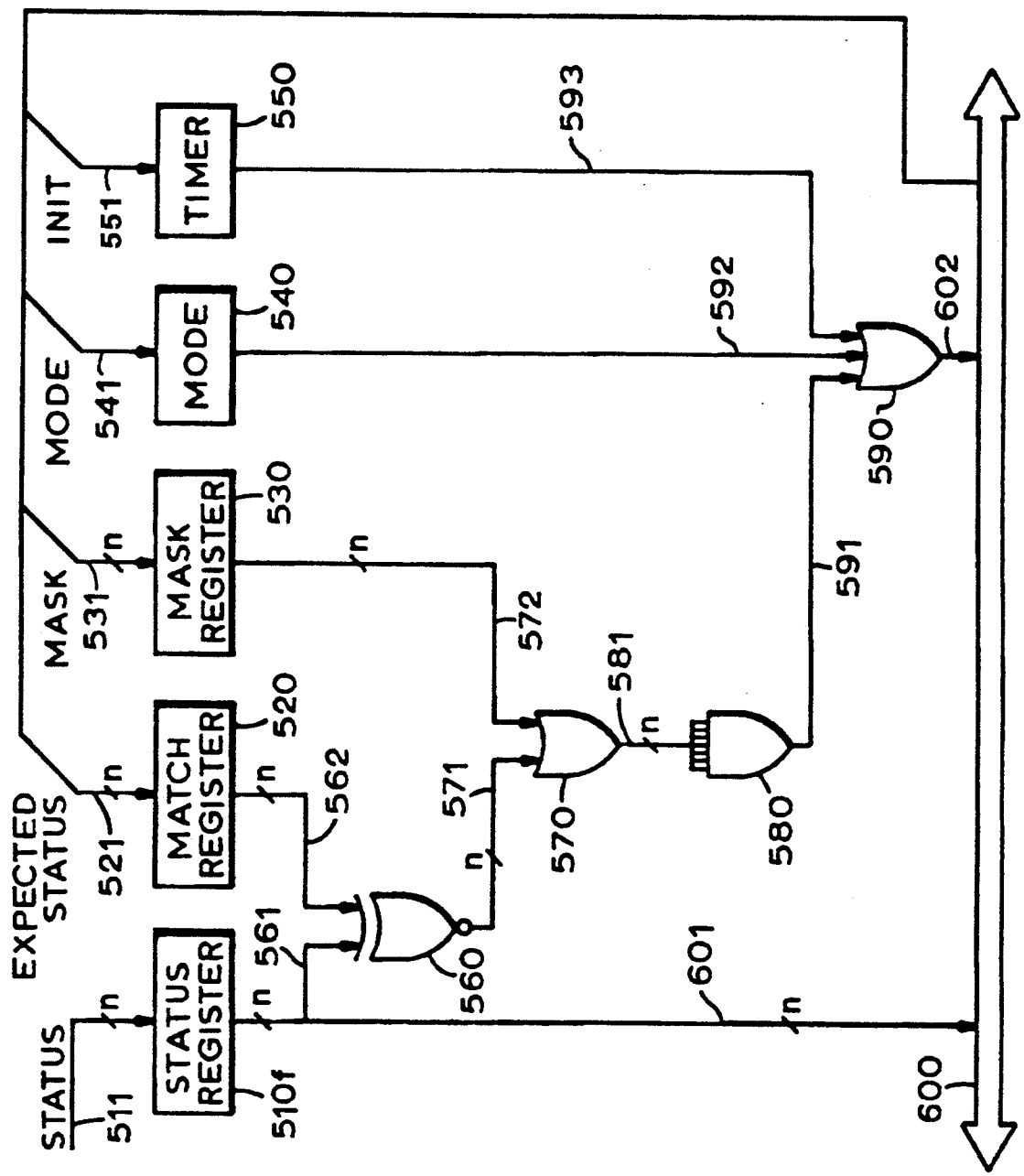
FIG. 5 is a logic diagram of the registers and control logic of the apparatus according to the present invention.

Now referring to FIG. 5, in conjunction with FIGS. 1-4, the general structure of a polling apparatus in accordance with the invention is shown. The apparatus, in addition to the status register, includes additional registers and control logic which improve polling. As will become apparent, the apparatus of FIG. 5, when used in conjunction with the polling programs 20 or 120, reduces system bus 600 load without adversely impacting critical computer system 5 operations. The apparatus may be utilized by the polling programs 20 or 120 running on any of the CPUs 10a-10b, sampling any of the various status registers 510a-510f.

In the I/O device 11c of FIG. 1, the status register 510f may receive status data via line 511. By way of example, any of the CPUs 10a-10b, memory 10c, and any of the I/O devices 11a-11c are capable of generating status data for the status register 510f. The status register 510f may includes, by way of example, one or more bits, a bit, either alone or in combination with other bits, indicating a generally predeterminable or predefined status condition.

In addition to the status register 510f, the polling apparatus according to the present invention may also include, in each of the CPUs 10a-10b, memory 10c, and in each of the I/O devices 11a-11c, for reasons that will become apparent, a match register 520 and a mask register 530. The match register 520 receives data via line 521 and the mask register 530 receives data via line 531. The status, match and mask registers 510, 520, and 530 respectively, store one or more bits, as shown generally by the "/n" notation on the various lines in FIG. 5. Although not shown in FIG. 5 for reasons of clarity, it should be understood that the status, match and mask registers, 510, 520, 530 are configured to receive data over the system bus 600, that is, lines 511, 521 and 531 are coupled to system bus 600.

Prior to the polling of the status register 510f, the match register 520 is loaded, via line 521, with a bit pattern, that is logical "0's" and "1's", which corresponds to expected or desired status in the status register 510f at the occurrence the future desired event E (see FIG. 3). Similarly, the mask register 530 is loaded via line 531, prior to polling, with another bit pattern, each bit corresponding to a bit in the status register 510f. Only those bits in the status register 510f for which the corresponding bit in the bit pattern of the mask register 530 is set to a logical "0" are considered significant during the subsequent polling of the status register 510f. In other words, if a polling operation only needs to examine certain selected bits of the status register 510f, the respective corresponding bits of the bit pattern in the mask register 530 are set accordingly to logical "0". Any bits in the status register 510f which are not significant for the event E, have the respective corresponding bits in the same location of the bit pattern in the mask register 530 set to logical "1".

The apparatus also includes a one bit mode register 540 which serves as a means for selectively enabling and disabling the operation of the apparatus. The mode register 540 is set to either a logical "0" or logical "1" over line 541 to indicate the two modes in which the polling apparatus operates. If the mode register 540 is set to a "1", delayed read polling is disabled, that is, the status data are presented to the system bus 600 immediately upon being polled, regardless of the specific status data. Conversely, if the mode register 540 contains a "0", the control logic of the apparatus is enabled, as will be described herein, to delay the presentation of the status data to the system bus 600 until a specific desired status condition is detected A timer 550 is initialized over the system bus 600 by signal INIT via line 551 to ensure some response by the logic of the present invention during polling even if the desired event E is delayed indefinitely. The delay of time 550 is generally some period less than the system bus 600 time-out value. The purpose of the polling time-out signal of timer 550 is to prevent a bus 600 time-out error in cases where the desired or expected status is not detected within the interval allotted for a bus transfer. In other words, the output of the timer 550 on line 693 is normally a logical "0". But, should the time 550 expire, after being initialized, the output on line 593 becomes a logical "1". Although not shown in FIG. 5 for reasons of clarity, it should be understood that the mode register 540 and the timer 550 are configured to receive data over the system bus 600, that is lines 541 and 551 are coupled to system bus 600.

As shown in FIG. 5, the status register 510*f* is coupled as a first input to a two input exclusive NOR (XNOR) gate 560 by line 561. The second input to the XNOR gate 560 is coupled to the output of the match register 520 by line 562. The output of the XNOR gate 560 is coupled as a first input to a two input OR gate 570 by line 571. The output of the mask register 530 is coupled to the second input of the OR gate 570 by line 572. The output of OR gate 570, is coupled to an "n" input AND gate 580 by line 581, where "n" generally represents the number of bits in the status, match and mask registers 510, 520 and 530 respectively. The output of the AND gate 580 is coupled to a first input of a three input OR gate 590 by line 591. The output of the mode register 540 is coupled to the second input of the OR gate 590 via line 592, while the third input to the OR gate 590 receives the output of timer 550, the polling time-out signal, via line 593.

Therefore, in the polling apparatus of FIG. 5, the output of the status register 510*f* is coupled to the data lines (not shown) of the system bus 600 via line 601, providing a means for presenting the status data in the status register 510*f* to the data lines of the system bus 600. Also, the output of the OR gate 590 is coupled to the control lines (not shown) of the system bus 600 by line 602, providing a means for communicating a RETURN DATA signal to the bus interface logic (not shown) coupled to the system bus 600. In other words, only if the signal on line 602 are a logical "1" is the status data in the status register 510*f* presented to data lines (not shown) of the system bus 600 via line 601.

Figure 7:
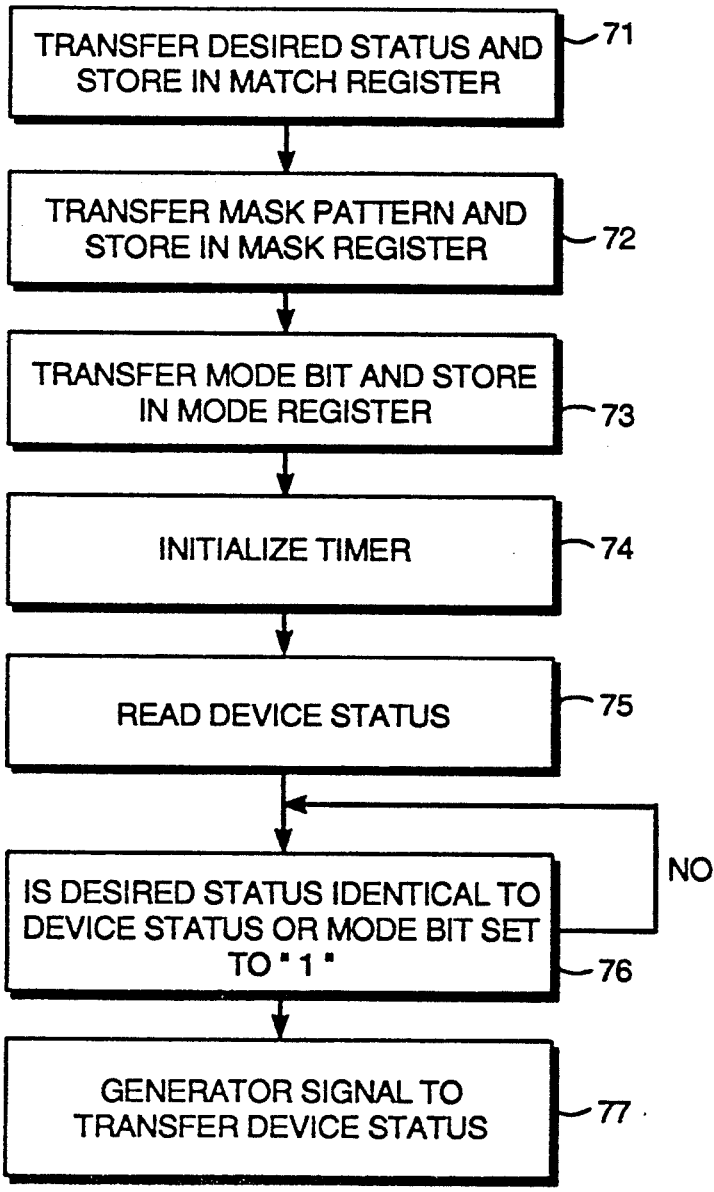
FIG. 7 is a block diagram of the polling procedure according to the present invention.

Proceeding now to the discussion of the operation of the polling apparatus, as shown in FIG. 7, prior to the polling of the status register 510*f* by polling program 20, the match register 520 is loaded, via line 521, with a bit pattern which corresponds to the desired or expected status condition, step 71. Also, prior to polling, the mask register 530 is loaded, via line 531, with a mask bit pattern wherein a logical "0" indicates that the corresponding bit in the corresponding location in the status register 510*f* is significant in a subsequent polling operation, step 72. A logical "1" in the mask pattern indicates that the corresponding bit in the corresponding location in the status register 510*f* is not significant with respect to the subsequent polling. The mode register 540, is set approximately over line 541, either to a "1" or a "0", depending on whether polling with delay should be disabled or enabled, respectively, step 73. Also the timer 550 is initialized, via line 551, to a predetermined time interval, to ensure some status register 510*f* response prior to a bus 600 time-out, step 74. The various registers 510*f*, 520, 520 and 540 and timer 550 may be initialized, by way of example, by programming or hardware of one of the CPUs 10*a*-10*b*. After initialization, the polling of the status register 510*f* in I/O device 11*c* by polling program 20 or 120 in CPU 10*a* commences.

The polling apparatus, in response to a READ REQ, step 75, presents, bit by bit, the "n" bits of the status register 510*f* and the match register 520 as inputs to the XNOR gate 560 via lines 561 and 562 respectively. The logical states of the two input XNOR gate 560 are expressed by th following truth table as:

| Input | Output |
|---|---|
| 1 2 | |
| 0 0 | 1 |
| 0 1 | 0 |
| 1 0 | 0 |
| 1 1 | 1 |

The output from the XNOR gate 560 on line 571 is a logical "1" only when the two input bits corresponding to respective bits in the status and match register 510*f* and 520 are the same, that is, both inputs produce an output "1". The output on line 571 for the respective bits in the status and match registers 510*f* and 520 which are not the same is a logical "0". Therefore, the first input to OR gate 570 over liens 571 indicates whether or no the status data in the status register 510*f* are the desired status as represented in the match register 520, step 76. In other words, and as further described herein, the output signal from the exclusive NOR (XNOR) gate 560) comparison is used as a signal to selectively control the presentation of the status data in the status register 510*f* to the system bus 600, step 77. As an additional feature of the present invention, the second input to the OR gate 570 from the mask register 530 over lines 572 indicates which of the buts in the status register 510*f* should be considered significant for the polling operation. Therefore, the output, bit by bit, of the OR gate 570 on line 581, is a logical "1" for those bits which are equal in corresponding locations in both the status register 510*f* and the match register 520, and also for any bit in the status register 510*f* which has a corresponding bit set to a logical "1" in the mask register 530 (i.e. that bit position is not significant in the current polling operation).

The output of the OR gate 570 is connected to the input of the AND gate 580 by line 581. The purpose of the AND gate 580 is to reduce the result of the comparing and masking operations on the various bits, represented by "/n" on line 581, to a single logical "0" or logical "1" signal. That is, the output of the AND gate 580 on line 591 is a logical "1" only if the status data in the status register 510f, as masked by the mask register 530, is the same as the desired status as indicated by the contents of the match register 520. Otherwise, if the status register 510f does not contain the desired status, the output of the AND gate 580 on line 591 is a logical "0".

The purpose of the three input OR gate 590 is to provide a RETURN DATA signal for the bus interface logic (not shown). In other words, a logical "1" on line 602 is sufficient to communicated the status data in the status register via the data lines (not shown) of the system bus 600.

The output of the OR gate 590 on line 602 is a logical "1" under the following three conditions: first, if the respective bits, as masked by mask register 530, in the status register 510f and match registers 520 are the same; second, if the mode register 540 is set to a logical "1", whether or not the status data in the status register 510f are the desired or expected status; third, in any event, whether or not the status data in the status register 510f are the desired or status, even if the mode register is set to logical "0", at the expiration of the delay period in timer 550.

Figure 6:
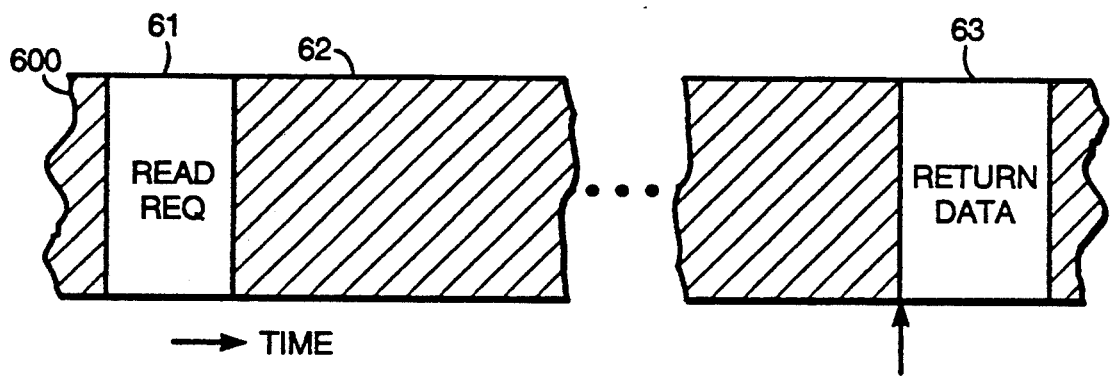
FIG. 6 is a timing diagram of system bus activity during polling with apparatus of FIG. 5.

Now, referring to FIG. 6, there is shown a generalized timing diagram of the bus 600 transactions for polling with the apparatus of FIG. 5. The first step 21 of the polling program of FIG. 2 places a READ REQ (request) transaction 61 on the system bus 600. When the polling apparatus of FIG. 5 delays the return of the status data during time interval 62, as described herein, the bus 600 is available for other transactions. The RETURN DATA transaction 63 is generally presented to the bus 600 after event E, (unless the apparatus is disabled, or a polling time-out has occured), the instant the desired status condition is detected in the status register 510f (of FIG. 5). When the timing diagram of FIG. 6 is compared with the one of FIG. 3, the improvement in system bus 600 bandwidth during polling is readily discernable.

It should be recognized that the specific names given to the components, and the specific arrangements shown in the drawings do not suggest any specific construction of the polling apparatus. For example, the various registers may well be loaded by logic activated by the polling program 20 read operation 21, allowing the implementation of the present invention without requiring extensive modification of traditional programs. Also, the improvements to polling articulated herein may improve polling in a single processor computer system not necessarily incorporating a system bus.

While the present invention has been shown and described with particularity to a preferred embodiment therefore, it will be understood by those skilled in the art that the foregoing and other changes in form and detail may be made therein without departing from the spirit and scope of the present invention, and that the invention is not limited to this embodiment. The invention, therefore, is to be defined according to the following claims.

What is claimed is:

1. A method for a central processing unit (CPU) to obtain from an input/output (I/O) device the contents of a status register therein indicating the status thereof, comprising the steps of:
   transferring from said CPU to said I/O device expected status data corresponding to a predetermined status to be attained by said I/O device upon the occurrence of an expected event;
   storing said expected status data in a match register in said I/O device for use during a subsequent polling operation;
   issuing from said CPU to said I/O device a request to read said status register as part of said polling operation;
   comparing the contents of said status register to the contents of said match register to determine whether said event has occurred, the occurrence of said event being indicated by a match therebetween; and
   returning the contents of said status register to said CPU in response to said request upon an indication of a match in said comparing step.

2. A method according to claim 1, further comprising the steps of:
   transferring from said CPU to said I/O device a mask pattern to be used in said comparing step, said mask pattern having at least one bit set to one binary logic level to indicate that a corresponding bit in said status register is to be used in said comparing step, the remaining bits of said mask pattern being set to the other binary logic level to indicate that corresponding bits in said status register are to be ignored in said comparing step;
   storing said mask pattern in a mask register in said I/O device for use during said polling operation; and
   forcing the indication of a match in said comparing step for those bits of said status register corresponding to those bits of said mask register having said other binary logic level.

3. A method according to claim 1, further comprising the steps of:
   transferring a mode data bit from said CPU to said I/O device prior to said polling operation, said mode data bit being set to one binary logic level to indicate that the contents of said status register should be returned to said CPU upon the receipt of said request by said I/O device without regard for a match in said comparing step, said mode data bit being otherwise set to the other binary logic level;
   storing said mode data bit in a mode register in said I/O device for use during said polling operation;
   returning the contents of said status register to said CPU immediately upon the receipt of said request by said I/O device without regard for a match in said comparing step if the bit stored in said mode register has said one binary logic value; and
   returning the contents of said status register to said CPU in response to said request upon an indication of a match in said comparing step if the bit stored in said mode register has the other binary logic value.

4. A method according to claim 1, further comprising the steps of:
   initializing a timer in said I/O device used to determine whether the duration between the receipt of said request by said I/O device and the return of the contents of said status register to said CPU exceeds a predetermined maximum duration;
   starting said timer upon receipt of said request by said I/O device; and
   returning the contents of said status register to said CPU upon the expiration of said time if by that time a match has not been indicated in said comparing step.

5. A computer system, comprising:
 a central processing unit (CPU);
 a status register coupled to said CPU whose contents indicate the status of an associated input/output (I/O) device to be polled by said CPU;
 a match register coupled to said CPU to be written therefrom with expected status data corresponding to a predetermined status to be attained by said I/O device upon the occurrence of an expected event;
 a comparator coupled to said status register and said match register to indicate whether the contents thereof match;
 means for receiving from said CPU a request to read said status register to determine whether said event has occurred; and
 means for returning the contents of said status register to said CPU in response to said request upon an indication of a match by said comparator.

6. A computer system according to claim 5, further comprising:
 a mask register coupled to said CPU to receive therefrom a mask pattern, said mask pattern having at least one bit set to one binary logic level to indicate that a corresponding bit in said status register is to be used by said comparator, the remaining bits of said mask pattern being set to the other binary logic level to indicate that corresponding bits in said status register are to be ignored by said comparator, said mask register being coupled to said comparator to provide said mask pattern thereto; and wherein said comparator has means for forcing the indication of a match for those bits of said status register corresponding to those bits of said mask register having said other binary logic level.

7. A computer system according to claim 5, further comprising:
 a mode register coupled to said CPU to receive therefrom a mode data bit, said mode data bit being set to one binary logic level to indicate that the contents of said status register should be returned to said CPU upon the receipt of said request by said I/O device without regard for a match indication by said comparator, said mode data bit being otherwise set to the other binary logic level;
 means for returning the contents of said status register to said CPU upon the receipt of said request by said I/O device without regard for a match indication by said comparator if the bit stored in said mode register has said one binary logic value; and
 means for returning the contents of said status register to said CPU in response to said request an indication of a match by said comparator if the bit stored in said mode register has the other binary logic value.

8. A computer system according to claim 5, further comprising:
 a timer coupled to said receiving means, said comparator, and said returning means to determine whether the duration between the receipt of said request by said I/O device and the return of the contents of said status register to said CPU exceeds a predetermined maximum duration;
 means for starting said timer upon receipt of said request by said I/O device; and
 means for returning the contents of said status register to said CPU upon the expiration of said timer if by that time a match has not been indicated by said comparator.

* * * * *